(12) United States Patent
Ma et al.

(10) Patent No.: US 11,308,974 B2
(45) Date of Patent: Apr. 19, 2022

(54) TARGET VOICE DETECTION METHOD AND APPARATUS (71) Applicant: IFLYTEK CO., LTD., Anhui (CN)

(72) Inventors: Feng Ma, Anhui (CN); Haikun Wang, Anhui (CN); Zhiguo Wang, Anhui (CN); Guoping Hu, Anhui (CN)

(73) Assignee: IFLYTEK CO., LTD., Anhui (CN)

( * ) Notice: Subject to any disclaimer, the term of this patent is extended or adjusted under 35 U.S.C. 154(b) by 0 days.

(21) Appl. No.: 16/757,892

(22) PCT Filed: Jul. 16, 2018

(86) PCT No.: PCT/CN2018/095758
§ 371 (c)(1),
(2) Date: Apr. 21, 2020

(87) PCT Pub. No.: WO2019/080551
PCT Pub. Date: May 2, 2019

(65) Prior Publication Data
US 2020/0342890 A1    Oct. 29, 2020

(30) Foreign Application Priority Data
Oct. 23, 2017    (CN) .......................... 201710994194.5

(51) Int. Cl.
*G10L 21/0264* (2013.01)
*G10L 21/0216* (2013.01)
*G10L 25/03* (2013.01)

(52) U.S. Cl.
CPC .......... *G10L 21/0264* (2013.01); *G10L 25/03* (2013.01); *G10L 2021/02166* (2013.01)

(58) Field of Classification Search
CPC ................. G10L 21/0264; G10L 25/03; G10L 2021/02166; G10L 25/15; G10L 25/27; G10L 15/08; G01H 17/00
(Continued)

(56) References Cited

U.S. PATENT DOCUMENTS 8,650,029 B2 * 2/2014 Thambiratnam ....... G10L 25/84
704/200
9,715,660 B2 * 7/2017 Parada San Martin ......................
G06N 3/0454
(Continued)

FOREIGN PATENT DOCUMENTS

CN    103181190 A    6/2013
CN    104766093 A    7/2015
(Continued)

OTHER PUBLICATIONS

Chinese Office Action issued in CN201710994194.5 dated Apr. 14, 2020, 17 pages.
(Continued)

*Primary Examiner* — Akwasi M Sarpong
(74) *Attorney, Agent, or Firm* — Zhong Law, LLC (57) ABSTRACT

A target voice detection method and a target voice detection apparatus are provided. The method includes: receiving sound signals collected by a microphone array; performing a beamforming process on the sound signals to obtain beams in different directions; extracting a detection feature of each frame based on the sound signals and the beams in different directions; inputting an extracted detection feature of a current frame into a pre-constructed target voice detection model to obtain a model output result; and obtaining a target voice detection result of the current frame based on the model output result.

13 Claims, 5 Drawing Sheets

(58) Field of Classification Search
USPC .................. 704/201, 200, 233, 235; 706/21
See application file for complete search history.

(56) References Cited

U.S. PATENT DOCUMENTS

| | | | |
|---|---|---|---|
| 9,972,339 B1* | 5/2018 | Sundaram | G10L 25/30 |
| 10,546,593 B2* | 1/2020 | Wung | G10L 21/0232 |
| 10,580,401 B2* | 3/2020 | Lopez Moreno | G10L 15/16 |
| 10,771,894 B2* | 9/2020 | Janse | H04R 3/005 |
| 11,120,786 B2* | 9/2021 | Rozen | G10L 15/04 |
| 2012/0099732 A1 | 4/2012 | Visser | |
| 2014/0343929 A1 | 11/2014 | Liang | |
| 2015/0112674 A1* | 4/2015 | Zhang | G10L 15/063 704/235 |
| 2016/0059418 A1* | 3/2016 | Nakamura | G05D 1/0274 901/1 |
| 2016/0180214 A1* | 6/2016 | Kanevsky | G06N 3/0454 706/21 |
| 2016/0322055 A1* | 11/2016 | Sainath | H04R 3/005 |
| 2017/0278513 A1* | 9/2017 | Li | G10L 21/0224 |
| 2017/0337936 A1 | 11/2017 | Han et al. | |
| 2018/0174575 A1* | 6/2018 | Bengio | G10L 15/16 |
| 2018/0261225 A1* | 9/2018 | Watanabe | G10L 15/16 |

FOREIGN PATENT DOCUMENTS

| | | |
|---|---|---|
| CN | 105244036 A | 1/2016 |
| CN | 105590631 A | 5/2016 |
| CN | 105788607 A | 7/2016 |
| CN | 105869651 A | 8/2016 |
| CN | 205621437 U | 10/2016 |
| CN | 106328156 A | 1/2017 |
| CN | 106483502 A | 3/2017 |
| CN | 106504763 A | 3/2017 |
| CN | 106710603 A | 5/2017 |
| CN | 106782618 A | 5/2017 |
| CN | 107785029 A | 3/2018 |
| JP | 2017107141 A | 6/2017 |
| KR | 1020090037845 A | 4/2009 |
| WO | 2017164954 A1 | 9/2017 |

OTHER PUBLICATIONS

Li et al., "Research on Acoustic Source Localization and Speech Enhancement in Human-Computer Interaction" South China University of Technology, 2015, pp. 1-59.

Han et al., "Study on Array Speech Recognition under Complex Environment", Liaoning University of Technology, 2014, pp. 1-52.

Xiaoxue Li "A Study of Speech Enhancement and Recognition Based on Microphone Array Processing", CMFD, 2011, pp. 1-88.

Extended European Search Report issued in EP18871326.7 dated Jun. 30, 2021, 7 pages.

Japanese Office Action issued in 2020-517383 dated Apr. 30, 2021, 10 pages.

Zhang et al., "Deep Learning Based Binaural Speech Separation in Reverberant Environments", IEEE/ACM Transactions on Audio, Speech, and Language Processing, vol. 25, No. 1, 2017, pp. 1075-1084.

Hanson et al., "Real-Time Source Separation on a Field Programmable Gate Array Platform", 34th Annual International Conference of the IEEE EMBS, 2012, pp. 2925-2928.

Jiang et al., "Using Energy Difference for Speech Separation of Dual-microphone Close-talk System", Sensors & Transducers, 2013, pp. 122-127.

Healy et al., "An algorithm to increase speech intelligibility for hearing-impaired listeners in novel segments of the same noise type", J. Acoust. Soc. Am., vol. 138, No. 3, 2015, pp. 1660-1669.

Wang et al., "On Training Targets for Supervised Speech Separation", IEEE/ACM Transactions on Audio, Speech, and Language Processing, vol. 22, No. 12, 2014, pp. 1849-1857.

Xiao et al., "A Study of Learning Based Beamforming Methods for Speech Recognition", Speech Processing in Everyday Environment, 2016, pp. 1-6.

Korean Office Action issued in 10-2020-7014261 dated Jul. 30, 2021, 10 pages.

International Search Report and the Written Opinion issued in PCT/CN2018/095758 dated Oct. 18, 2018, 15 pages.

Japanese Office Action issued in 2020-517383 dated Jan. 25, 2022, 9 pages.

* cited by examiner

TARGET VOICE DETECTION METHOD AND APPARATUS

The application is a national phase application of PCT international patent application PCT/CN2018/095758, filed on Jul. 16, 2018 which claims the priority to Chinese Patent Application No.201710994194.5, titled "TARGET VOICE DETECTION METHOD AND APPARATUS", filed on Oct. 23, 2017 with the China National Intellectual Property Administration, both of which are incorporated herein by reference in their entireties.

TECHNICAL FIELD

The present disclosure relates to the field of voice signal processing, and in particular to a target voice detection method and a target voice detection apparatus.

BACKGROUND

Voice, as one of the most natural, convenient, and fast manner for interactions, is widely used in people's daily life and work. The processing of voice signals, such as voice coding and noise reduction, has also been a hot research topic for researchers in related fields. Taking noise reduction from voice as an example, target voice detection is one of the most important steps in noise reduction. Thus, the accuracy of target voice detection directly affects the performance of noise reduction. If the target voice detection is not accurate, the useful portion of the voice will be seriously distorted in the noise reduction process. Therefore, it is important to detect the target voice accurately.

The existing target voice detection methods mainly include the following two types.

1. Intensity Difference-Based Target Voice Detection Method

For example, noise reduction is performed on a primary microphone signal firstly, then voice detection is performed based on difference in signal strengths between the primary microphone signal after noise reduction is performed and a secondary microphone signal; alternatively, the target voice detection is performed based on difference in energies between a voice reference signal and a noise reference signal. This type of method is based on an assumption that an intensity of a target signal collected by the primary microphone is greater than an intensity of a target signal collected by the secondary microphone, and intensities of noise signals in the primary microphone and the secondary microphone are the same. For example, if a signal-to-noise ratio is high, a ratio of energy of the signal collected by the primary microphone to energy of the signal collected by the secondary microphone is greater than 1. Further, if the signal-to-noise ratio is low, the ratio of the energy of the signal collected by the primary microphone to the energy of the signal collected by the secondary microphone is less than 1.

Application scenario of the intensity difference-based target voice detection method is limited because the method is effective only in the case that the difference between the intensity of the target signal reaching the primary microphone and the intensity of the target signal reaching the secondary microphone reaches a certain threshold (for example, the difference is greater than 3db). Moreover, if the noise is large and the signal-to-noise ratio is low, the probability of the target voice being detected is low.

2. Machine Learning-Based Target Voice Detection Method

For example, if a single-channel signal with noise is used as an input, and an ideal binary mask (IBM) or an ideal ratio mask (IRM) is used as an output, a value of the output may be used as a basis for existence of a target voice. Alternatively, if multi-channel data is used, multiple channels are combined into one channel as an input to obtain a mask.

The existing machine learning-based target voice detection method has the following problems. If only single-channel information is used, information is not fully utilized, resulting in ineffective target voice detection. Even when multi-channel information is used, only an original signal in one channel or a mixed signal in one channel can be processed by the neural network, which does not effectively use the spatial information among the multiple channels. If there is human acoustic interference in another direction in the noise, the effectiveness of the method may be sharply reduced.

SUMMARY

A target voice detection apparatus and a target voice detection method are provided according to the embodiments of the present disclosure to solve one or more problems in conventional target voice detection methods, such as limited application scenarios, low effectiveness of detection due to detection in a low signal-to-noise ratio environment, and poor detection effect due to insufficient use of information.

Therefore, following technical solutions are provided according to the present disclosure.

A target voice detection method includes: receiving sound signals collected by a microphone array; performing a beamforming process on the sound signals to obtain beams in different directions; extracting a detection feature of each frame based on the sound signals and the beams in different directions; inputting an extracted detection feature of a current frame into a pre-constructed target voice detection model to obtain a model output result; and obtaining a target voice detection result of the current frame based on the model output result.

Preferably, a process of constructing the target voice detection model includes: determining a topological structure of the target voice detection model; generating training data based on a clean voice and a simulated noise, and generating labeling information by labeling a target voice in the training data; extracting a detection feature of the training data; and obtaining parameters of the target voice detection model by performing training based on the detection feature and the labeling information.

Preferably, the target voice detection model is a classification model or a regression model, and an output of the target voice detection model is an ideal binary mask or an ideal ratio mask for each frequency point of the current frame.

Preferably, the detection feature includes space dimension information, frequency dimension information, and time dimension information.

Preferably, the extracting a detection feature of each frame based on the sound signals and the beams in different directions includes: concatenating the sound signals collected by the microphone array and beam signals at each frequency point of each frame to obtain a multi-dimensional space vector; calculating a modulus of each element in the multi-dimensional space vector, and then concatenating moduli for all frequency points of each frame to obtain a multi-dimensional frequency vector containing space information; and performing frame expansion on the multi-dimensional frequency vector containing space information to obtain a multi-dimensional time vector containing space information and frequency information.

Preferably, the method further includes: performing target voice detection based on an intensity difference to obtain an intensity difference-based detection result. Determining whether the current frame is a target voice frame based on the model output result includes: fusing the intensity difference-based detection result and the model output result to obtain the target voice detection result of the current frame.

Preferably, the performing target voice detection based on an intensity difference to obtain an intensity difference-based detection result includes: obtaining a voice reference signal and a noise reference signal based on the beams in different directions; calculating a power of the voice reference signal and a power of the noise reference signal; calculating a power ratio of the power of the voice reference signal to the power of the noise reference signal; and obtaining the intensity difference-based detection result based on the power ratio.

A target voice detection apparatus includes a signal receiving module, a beamforming module, a detection feature extracting module, a first detecting module, and a detection result outputting module. The signal receiving module is configured to receive sound signals collected by a microphone array and output the sound signals to the beamforming module. The beamforming module is configured to perform a beamforming process on the inputted sound signals to obtain beams in different directions. An input of the detection feature extracting module is connected to an output of the signal receiving module and an output of the beamforming module, and the detection feature extracting module is configured to extract a detection feature of each frame based on the sound signals and the beams in different directions, and output the extracted detection feature to the first detecting module. The first detecting module is configured to input a detection feature of a current frame extracted by the detection feature extracting module into a pre-constructed target voice detection model to obtain a model output result, and send the model output result to the detection result outputting module. The detection result outputting module is configured to obtain a target voice detection result of the current frame based on the model output result.

Preferably, the apparatus further includes a model constructing module configured to construct the target voice detection model. The model constructing module includes: a structure design unit, configured to determine a topological structure of the target voice detection model; a training data processing unit, configured to generate training data based on a clean voice and a simulated noise and generate labeling information by labeling a target voice in the training data; a feature extraction unit, configured to extract a detection feature of the training data; and a training unit, configured to obtain parameters of the target voice detection model by performing training based on the detection feature and the labeling information.

Preferably, the target voice detection model is a classification model or a regression model.

Preferably, the apparatus further includes a second detecting module, having an input connected to an output of the beamforming module, configured to perform target voice detection based on an intensity difference to obtain an intensity difference-based detection result and send the intensity difference-based detection result to the detection result outputting module. The detection result outputting module is configured to fuse the intensity difference-based detection result and the model output result to obtain the target voice detection result of the current frame.

Preferably, the second detecting module includes: a reference signal obtaining unit, configured to obtain a voice reference signal and a noise reference signal based on the beams in different directions; a calculation unit, configured to calculate a power of the voice reference signal and a power of the noise reference signal and calculate a power ratio of the power of the voice reference signal to the power of the noise reference signal; and a detection result unit, configured to obtain the intensity difference-based detection result based on the power ratio.

A computer readable storage medium includes computer program codes. The computer program codes, when executed by a computer unit, cause the computer unit to perform the target voice detection method according to foregoing descriptions.

A target voice detection device includes a processor, a memory, and a system bus. The processor and the memory are connected via the system bus. The memory stores one or more programs. The one or more programs include instructions. The instructions, when executed by the processor, cause the processor to perform the target voice detection method according to foregoing descriptions.

A computer program product, when executed on a terminal device, causes the terminal device to perform the target voice detection method according to foregoing descriptions.

With the target voice detection method and the target voice detection apparatus according to the embodiments of the present disclosure, sound signals collected by a microphone array are received, then a beamforming process is performed on the sound signals to obtain beams in different directions, and then a detection feature of each frame is extracted based on the sound signals and the beams in different directions, and then a target voice is detected by using a pre-constructed target voice detection model and multi-channel information, thereby effectively improving the accuracy of target voice detection and further eliminating the problem of limited application scenarios. In this way, an accurate detection result can be obtained even in a low signal-to-noise environment.

Further, the target voice detection result of the current frame is obtained by combining intensity difference-based detection results, in other words, fusing the intensity difference-based detection result and the model-based detection result, thereby further improving the accuracy of the detection result.

BRIEF DESCRIPTION OF THE DRAWINGS

The drawings to be used in the description of the embodiments are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings.

DETAILED DESCRIPTION OF THE EMBODIMENTS

In order to enable those skilled in the art to better understand the solutions according to the embodiments of the present disclosure, the embodiments of the present disclosure will be described in detail below in connection with the drawings and embodiments.

Figure 1:
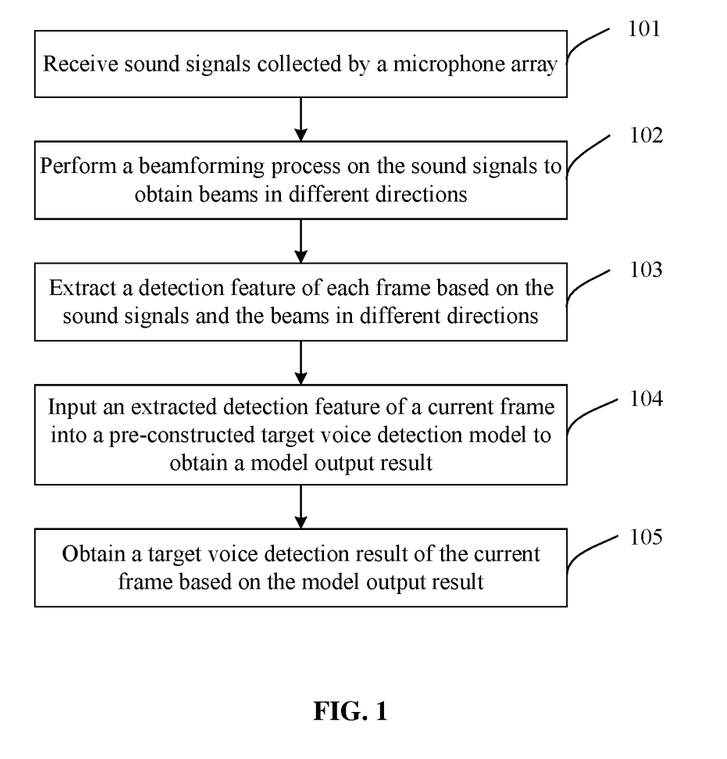
FIG. 1 is a flow chart of a target voice detection method according to an embodiment of the present disclosure.

Reference is made to FIG. 1, which is a flow chart of a target voice detection method according to an embodiment of the present disclosure. The method includes the following steps 101 to 105.

In step 101, sound signals collected by a microphone array are received.

In specific applications, after the sound signals are collected, pre-processing is performed on the collected sound signals.

Taking a microphone array including M microphones as an example for collecting sound signals, the collected sound signals are $x_1(t)$, $x_2(t)$ ... $x_M(t)$.

The pre-processing mainly refers to transforming the received sound signals from time domain to frequency domain to obtain frequency domain signals $X(k,l)=[X_1(k,l), X_2(k,l) ... X_M(k,l)]^T$, where k represents frequencies (0, 1, ... K) of the frequency domain signals, and l represents a frame number.

In step 102, a beamforming process is performed on the sound signals to obtain beams in different directions.

For the beamforming algorithm, a conventional technology may be adopted, such as an adaptive algorithm based on direction estimation and a beamforming algorithm based on signal structure, which is not limited in the embodiment of the present disclosure. The signals collected by the microphone array are processed with the beamforming algorithm, and thus the microphone array has a larger gain for signals in certain directions in space domain and has a smaller gain for signals in other directions in the space domain, as if a beam in a direction is formed.

Beams, having main lobe distributions pointing to N different directions, are formed based on M microphones, where beams in N directions may be obtained by a beamformer:

$$\text{Beam}_N^n(k,l) = W^n(k,l)X(k,l) \quad (1)$$

where, $W^n(k,l)$ represents a coefficient of a beamformer at a k-th frequency point and pointing to an n-th direction, and $W^n(k,l)$ may be determined by different beamforming algorithms In step 103, a detection feature of each frame is extracted based on the sound signals and the beams in different directions.

The detection feature is comprehensive information including space dimension information, frequency dimension information, and time dimension information. Specific extraction process is as follows.

It is assumed that $\text{Beam}_N^T$ are preset output signals in a target direction, and $\text{Beam}_N^i$, $i \in 1,2,N-1$ are output signals in a non-target direction.

1. Space Dimension Information $V_1(k,l)$

Specifically, the obtained beam signals and the sound signals collected by the microphone array at each frequency point of each frame are concatenated to obtain a multi-dimensional space vector. For example, beams, having main lobe distributions pointing to N different directions, are formed based on M microphones, where the N beam signals and M microphone signals are concatenated into an (M+N) dimensional space vector $V_1(k,l)$ at each frequency point of each frame:

$$V_1(k,l)=[\text{Beam}_N^T(k,l), \text{Beam}_N^1(k,l), \ldots, \text{Beam}_n^{N-1}(k,l), X_1(k,l), \ldots, X_M(k,l)]^T \quad (2)$$

It should be noted that, in practice, there is no restriction on the concatenating order of the target direction output signals $\text{Beam}_N^T$, the non-target direction output signals $\text{Beam}_N^i$ and the sound signals collected by the microphone.

2. Frequency Dimension Information

Firstly, a modulus of each element in the multi-dimensional space vector is calculated, and then moduli for all frequency points of each frame are concatenated to obtain a multi-dimensional frequency vector containing space information. For example, a modulus of each element in $V_1(k,l)$ is calculated as follows, $MD(k,l)=f(V_1(k,l))$, where $f(x)=|x|^2$, and then moduli $MD(k,l)$ for all frequency points of an l-th frame are concatenated to obtain a (M+N)*K dimensional frequency vector:

$$V_2(l)=[MD(1,l);MD(2,l); \ldots ;MD(K,l)] \quad (3)$$

3. Time Dimension Information

Frame expansion is performed on the multi-dimensional frequency vector containing space information to obtain a multi-dimensional time vector containing space information and frequency information. For example, frame expansion is performed on $V_2(l)$, respectively extending P frames forward and backward, to obtain (M+N)*K*2P dimensional time dimension information:

$$V_3(l)=[V_2(l-P);V_2(l-P+1); \ldots ;V_2(l+P)] \quad (4)$$

In step 104, an extracted detection feature of a current frame is inputted into a pre-constructed target voice detection model to obtain a model output result.

To this end, detection feature $V_3(l)$ of the current frame l, including space dimension information, frequency dimension information, and time dimension information, is inputted into a pre-constructed target voice detection model. An output of the target voice detection model is an ideal binary mask (IBM) or an ideal ratio mask (IRM) for each frequency point k of the current frame l. Taking the output of the target voice detection model being IRM as an example, the output of the model may be defined as $I_{model}(k,l)$.

The target voice detection model may be configured as a classification model or a regression model. If the output is IRM, the target voice detection model is configured as a regression model; and if the output is not IRM, the target voice detection model is configured as a classification model.

The target voice detection model may be specifically configured as a neural network model such as a deep neural network (DNN) or a recurrent neural network (RNN).

In step 105, a target voice detection result of the current frame is obtained based on the model output result.

The model output result may be IBM or IRM. If the output of the target voice detection model is IBM, it can be determined whether the current frame is a target voice frame based on the output. If the output of the target voice detection model is IRM, it required to determine whether the current frame is a target voice frame based on a preset threshold. If the output of the target voice detection model is greater than the preset threshold, the current frame is determined as a target voice frame; and if the output of the target voice detection model is less than or equal to the preset threshold, the current frame is determined as a non-target voice frame. It is apparent that the IRM outputted by the target voice detection model may be directly used as a corresponding detection result.

Figure 2:
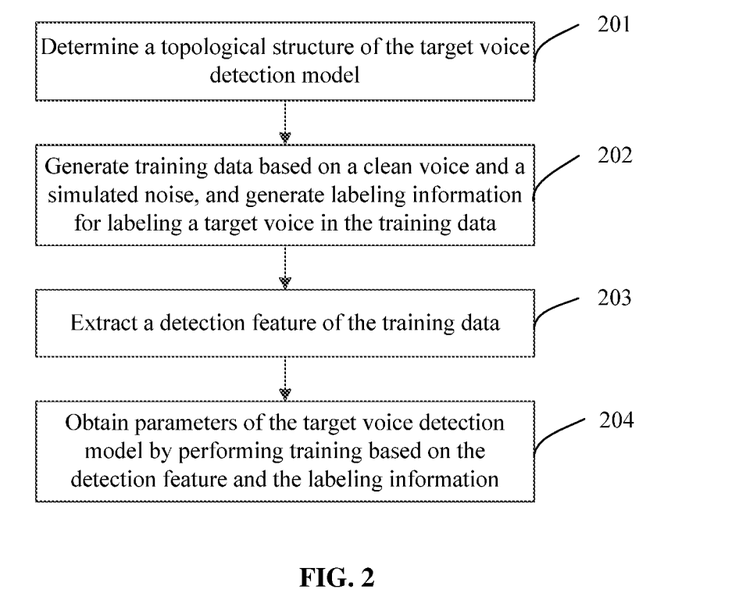
FIG. 2 is a flow chart of constructing a target voice detection model according to an embodiment of the present disclosure.

Reference is made to FIG. 2, which is a flow chart of constructing the target voice detection model. The target voice detection model is constructed by the following steps 201 to 204.

In step 201, a topological structure of the target voice detection model is determined.

As mentioned above, the target voice detection model may be configured as a classification model or a regression model, which does not limit the embodiments of the present disclosure.

In step 202, training data is generated based on a clean voice and a simulated noise, and it is generated labeling information by labeling a target voice in the training data.

The clean voice includes the target voice.

In step 203, a detection feature of the training data is extracted.

The detection feature is comprehensive information including space dimension information, frequency dimension information, and time dimension information. Specific process of extracting the detection feature is described above.

In step 204, parameters of the target voice detection model are obtained by performing training based on the detection feature and the labeling information.

With the target voice detection method according to the embodiments of the present disclosure, sound signals are collected by a microphone array, and then a beamforming process is performed on the sound signals to obtain beams in different directions, and then a detection feature of each frame is extracted based on the sound signals and the beams in different directions, and then a target voice is detected by using a pre-constructed target voice detection model and multi-channel information, thereby effectively improving the accuracy of target voice detection and further eliminating the problem of limited application scenarios. In this way, an accurate detection result can be obtained even in a low signal-to-noise environment.

In order to further improve the accuracy of the target voice detection result, a target voice detection method, based on results of an intensity difference-based detection method and a detection model-based detection method, is further provided according to another embodiment of the present disclosure.

Figure 3:
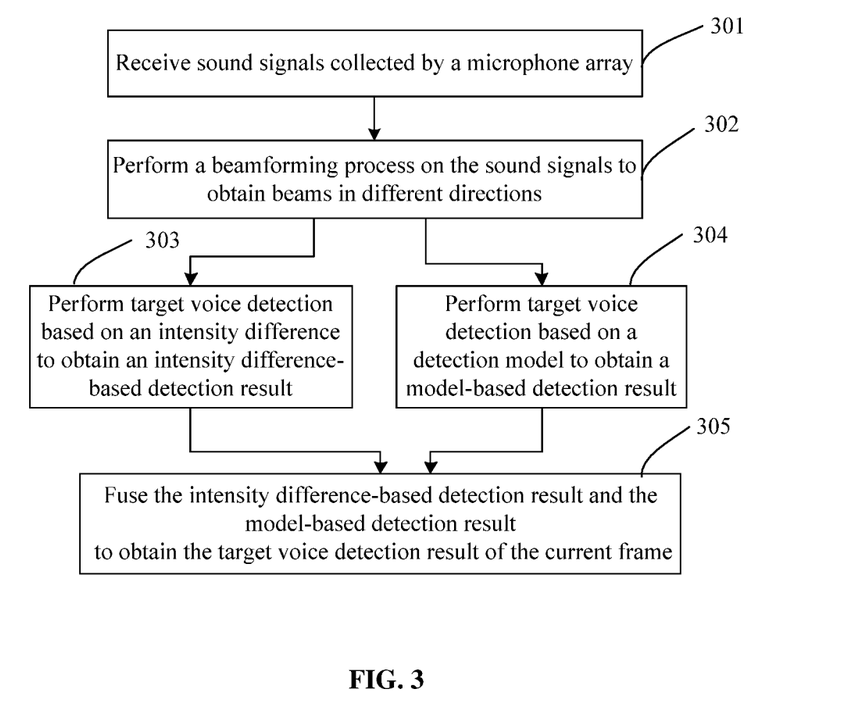
FIG. 3 is a flow chart of a target voice detection method according to another embodiment of the present disclosure.

Reference is made to FIG. 3, which is a flow chart of a target voice detection method according to an embodiment of the present disclosure. The method includes the following steps 301 to 305.

In step 301, sound signals collected by a microphone array are received.

In step 302, a beamforming process is performed on the sound signals to obtain beams in different directions.

In step 303, target voice detection is performed based on an intensity difference to obtain an intensity difference-based detection result.

Specifically, firstly, a voice reference signal and a noise reference signal are obtained based on the beams in different directions. Then, a power of the voice reference signal and a power of the noise reference signal are calculated. A power ratio of the power of the voice reference signal to the power of the noise reference signal is calculated. Finally, the intensity difference-based detection result is obtained based on the power ratio.

Assuming that the voice reference signal is F and the noise reference signal is U, a ratio of the energy of the voice reference signal to the energy of the noise reference signal is defined as:

$$R(k, l) = \frac{P_F(k, l)}{P_U(k, l)} \tag{5}$$

$P_F(k,l)$ and $P_U(k,l)$ respectively represent power estimates of the voice reference signal and the noise reference signal, and power estimation may be performed by using a first-order recursion:

$$P_F(k,l)=\alpha_1 P_F(k,l-1)+(1-\alpha_1)|X_F(k,l)|^2 \tag{6}$$

$$P_U(k,l)=\alpha_2 P_U(k,l-1)+(1-\alpha_2)|X_U(k,l)|^2 \tag{7}$$

$X_F(k,l)$ represents a voice reference signal, that is, a beamformed signal having a main lobe pointing to a target direction, which may be obtained by a fixed beamforming algorithm having a main lobe pointing to a target voice, such as Delay and Sum beamforming, Constant Beam-Width beam-former, and Super-Gain beamforming.

$X_U(k,l)$ represents a noise reference signal, that is, a beamformed signal having a null direction pointing to the target direction, which may be obtained by an adaptive blocking matrix. For example, a frequency domain normalized least mean square (NLMS) adaptive algorithm may be used to update a filter to obtain the noise reference signal:

$$X_U(k,l)=X_1(k,l)-W_N(k,l)X_2(k,l);$$

$$W_N(k, l+1) = W_N(k, l) + \alpha I_{ratio}(k, l)\frac{X_U(k, l)X_2^*(k, l)}{|X_2(k, l)|_2^2 + \delta} \tag{8}$$

$W_N(k,l)$ represents an adaptive blocking matrix coefficient; $\alpha$ represents a fixed learning step size, for example, the step size may be set to 0.05; superscript * indicates conjugating a complex number; $\delta$ represents a small positive number, for example, $\delta$ may be set to 0.001; and $I_{ratio}(k,l)$ represents a target voice detection result for a current frequency point:

$$I_{ratio}(k, l) = \begin{cases} 1, & R(k, l) > th1 \\ 0, & R(k, l) < th2 \\ R(k, l) - th/2_{th1-th2}, & \text{otherwise} \end{cases} \tag{9}$$

where thresholds th1 and th2 are obtained based on a large number of experiments and/or experience, for example, th2=2, and th1=0.5.

It should be noted that a threshold th may further be set. If $I_{ratio}(k,l)$ is greater than the threshold th, the current frame is determined as a target voice frame; and if $I_{ratio}(k,l)$ is not greater than the threshold th, the current frame is determined as a non-target voice frame.

In step 304, target voice detection is performed based on a detection model to obtain a model-based detection result.

For the target voice detection based on a detection model, reference may be made to steps 103 to 104 shown in FIG. 1, which is not described herein again.

In step 305, the intensity difference-based detection result and the model-based detection result are fused to obtain the target voice detection result of the current frame.

Specifically, a joint determination may be made based on $I_{model}(k,l)$ and $I_{ratio}(k,l)$. Taking Adaptive Noise Cancellation (ANC) in noise reduction from voice as an example, it is determined whether there is a target voice as follows:

$$I_{ANC}(k, l) = \begin{cases} 1, & I_{model}(k, l) > th3 \text{ or } I_{ratio}(k, l) > th4 \\ 0, & I_{model}(k, l) < th5 \text{ \& } I_{ratio}(k, l) < th6 \\ \max(1_{model}(k, l), 1_{ratio}(k, l)) & \text{otherwise} \end{cases} \quad (10)$$

thresholds th3, th4, th5, and th6 are obtained based on a large number of experiments and/or experience, for example, th3=0.5, th4=0.5, th5=0.25, and th6=0.25.

It should be noted that, if the target voice detection model is configured as a classification model and the intensity difference-based detection result is a binary result, that is, the intensity difference-based detection result is equal to 0 or 1, a fusion mode of logical "AND" or "OR" may be adopted in fusing the intensity difference-based detection result and the model-based detection result. Naturally, other fusion modes may be adopted in actual applications without limitation to the embodiments of the present disclosure.

It should be noted that target voice detection processes based on different methods are respectively described in steps 303 and 304. Steps 303 and 304 are performed independently, and there is no temporal relationship between steps 303 and 304. Steps 303 and 304 may be performed in parallel, or any one of the steps 303 and 304 may be performed first.

As such, with the target voice detection method according to the embodiments of the present disclosure, an accurate detection result can be obtained even in a low signal- to-noise environment, and an intensity difference-based detection result can be further considered, thereby further improving the accuracy of the detection result.

A computer readable storage medium is further provided according to an embodiment of the present disclosure. The computer readable storage medium includes computer program codes. The computer program codes, when executed by a computer unit, cause the computer unit to perform the target voice detection method according to the embodiments of the present disclosure.

A target voice detection device includes a processor, a memory, and a system bus. The processor and the memory are connected via the system bus. The memory stores one or more programs. The one or more programs include instructions. The instructions, when executed by the processor, cause the processor to perform the target voice detection method according to the embodiments of the present disclosure.

A computer program product, when executed on a terminal device, causes the terminal device to perform the target voice detection method according to the embodiments of the present disclosure.

A target voice detection apparatus is further provided according to an embodiment of the present disclosure.

Figure 4:
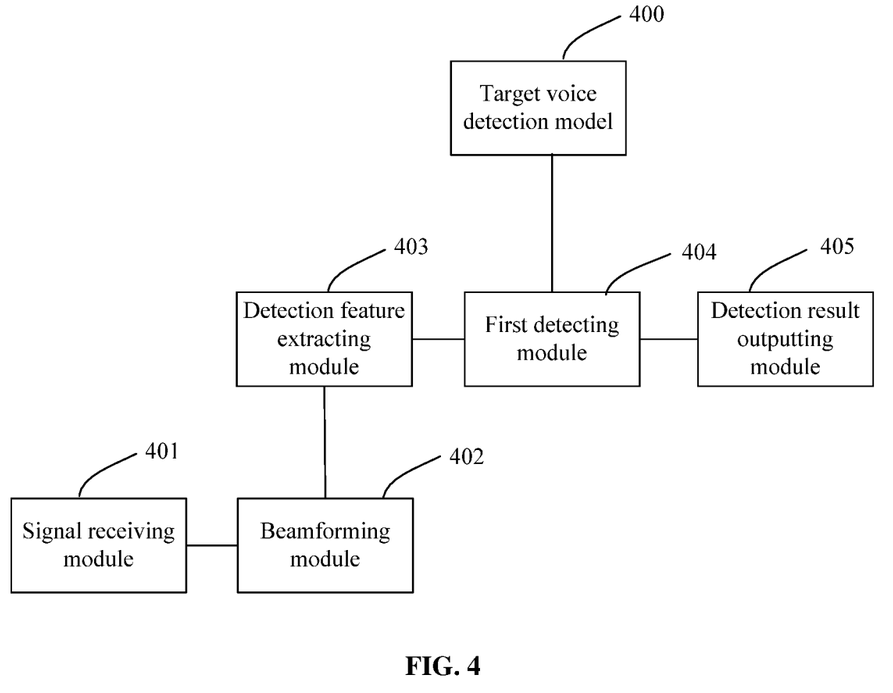
FIG. 4 is a schematic structural diagram of a target voice detection apparatus according to an embodiment of the present disclosure.

Reference is made to FIG. 4, which shows a schematic structural diagram of the apparatus.

According to the embodiment, the target voice detection apparatus includes a signal receiving module 401, a beamforming module 402, a detection feature extracting module 403, a first detecting module 404, and a detection result outputting module 405.

The signal receiving module 401 is configured to receive sound signals collected by a microphone array and output the sound signals to the beamforming module 402.

The beamforming module 402 is configured to perform a beamforming process on the inputted sound signals to obtain beams in different directions.

The input of the detection feature extracting module 403 is connected to an output of the signal receiving module 401 and an output of the beamforming module 402. The detection feature extracting module 403 is configured to extract a detection feature of each frame based on the sound signals and the beams in different directions, and output the extracted detection feature to the first detecting module 404.

The first detecting module 404 is configured to input a detection feature of a current frame extracted by the detection feature extracting module 403 into a pre-constructed target voice detection model 400 to obtain a model output result, and send the model output result to the detection result outputting module 405.

The detection result outputting module 405 is configured to obtain a target voice detection result of the current frame based on the model output result.

It should be noted that after the signal receiving module 401 collects the sound signals, the signal receiving module 401 is configured to perform pre- processing on the collected sound signals. The pre-processing mainly refers to transforming the received sound signals from time domain to frequency domain to obtain frequency domain signals.

The detection feature extracted by the detection feature extracting module 403 is comprehensive information including space dimension information, frequency dimension information, and time dimension information. The specific extraction process may refer to the description of the target voice detection method according to the embodiments of the present disclosure, which is not described herein again.

The target voice detection model 400 may be a classification model or a regression model, and may specifically be pre-constructed by a model constructing module. The model constructing module may be a part of the apparatus according to the present disclosure or may be independent of the apparatus according to the present disclosure without limitation to the embodiments of the present disclosure.

Figure 5:
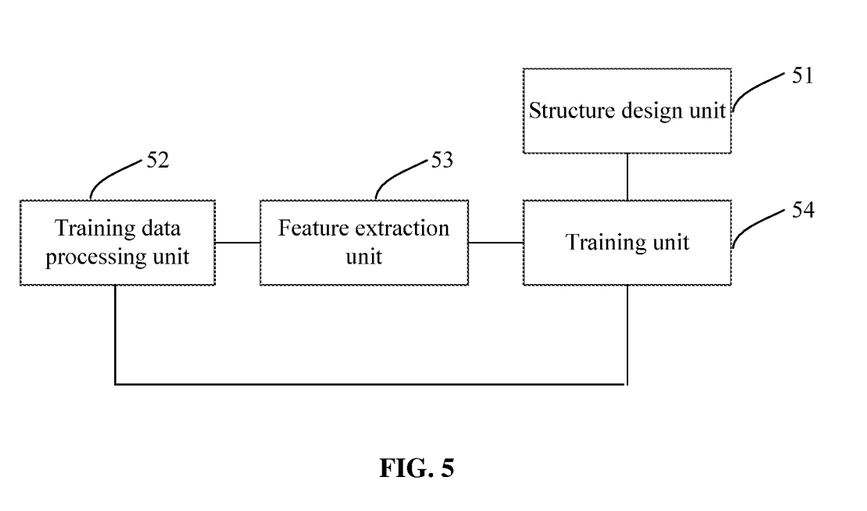
FIG. 5 is a schematic diagram of a model constructing module according to an embodiment of the present disclosure.

FIG. 5 shows a structure of the model constructing module according to an embodiment of the present disclosure. The model constructing module includes a structure design unit 51, a training data processing unit 52, a feature extraction unit 53, and a training unit 54.

The structure design unit 51 is configured to determine a topological structure of the target voice detection model.

The training data processing unit 52 is configured to generate training data based on a clean voice and a simulated noise and generate labeling information by labeling a target voice in the training data.

The feature extraction unit 53 is configured to extract a detection feature of the training data.

The training unit 54 is configured to obtain parameters of the target voice detection model by performing training based on the detection feature and the labeling information.

It should be noted that in a process of constructing the target voice detection model, the detection feature extracted by the feature extraction unit 53 is also comprehensive information including space dimension information, frequency dimension information, and time dimension information. The specific process of extracting the detection feature may refer to the description of the target voice detection method according to the embodiments of the present disclosure, which is not described herein again.

With the target voice detection apparatus according to the embodiments of the present disclosure, sound signals are collected by a microphone array, then a beamforming process is performed on the sound signals to obtain beams in different directions, and then a detection feature of each frame is extracted based on the sound signals and the beams in different directions, and then a target voice is detected by using a pre-constructed target voice detection model and multi-channel information, thereby effectively improving the accuracy of target voice detection. Moreover, there is no problem of limited application scenarios, and an accurate detection result can be obtained even in a low signal-to-noise environment.

Figure 6:
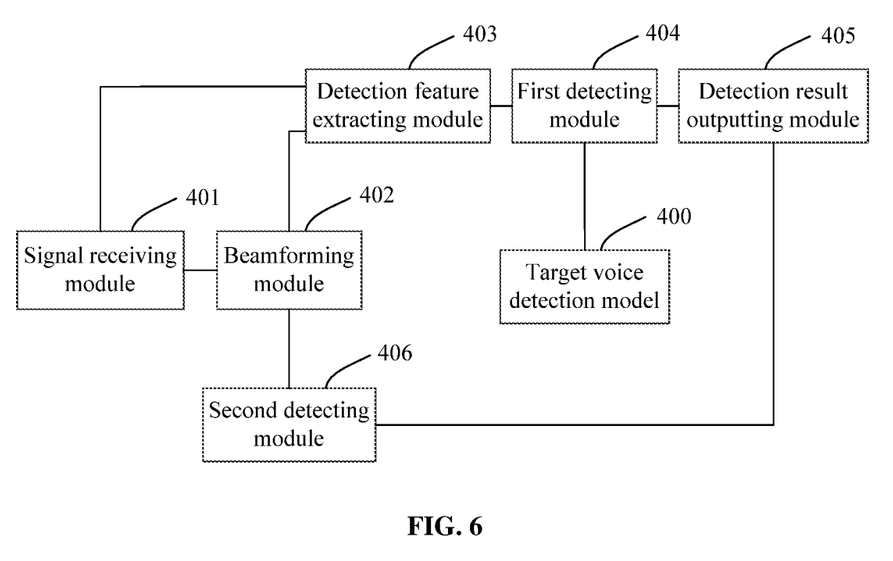
FIG. 6 is a schematic structural diagram of a target voice detection apparatus according to another embodiment of the present disclosure.

Reference is made to FIG. 6, which shows a schematic structural diagram of a target voice detection apparatus according to another embodiment of the present disclosure. Different from the embodiment shown in FIG. 5, the apparatus shown in FIG. 6 further includes a second detecting module 406, having an input connected to an output of the beamforming module 402, configured to perform target voice detection based on an intensity difference to obtain an intensity difference-based detection result and send the intensity difference-based detection result to the detection result outputting module 405.

The second detecting module 406 includes a reference signal obtaining unit, a calculation unit and a detection result unit.

The reference signal obtaining unit is configured to obtain a voice reference signal and a noise reference signal based on the beams in different directions.

The calculation unit is configured to calculate a power of the voice reference signal and a power of the noise reference signal and calculate a power ratio of the power of the voice reference signal to the power of the noise reference signal.

The detection result unit is configured to obtain the intensity difference-based detection result based on the power ratio.

Accordingly, according to the embodiment, the detection result outputting module 405 is configured to fuse the intensity difference-based detection result and the model output result to obtain the target voice detection result of the current frame. The specific fusion mode may refer to the description of the target voice detection method according to the embodiments of the present disclosure, which is not described herein again.

With the target voice detection apparatus according to the embodiments of the present disclosure, the target voice is detected based on the model-based detection method and the intensity difference-based detection method, and the detection results of the two different methods are comprehensively considered, thereby obtaining a more accurate detection result.

In the present disclosure, the embodiments are described in a progressive manner. Reference can be made to these similar parts among the embodiments, and each embodiment mainly focuses on an aspect different from other embodiments. Moreover, the apparatus embodiments described above are just schematic, a unit described as a separate component may be or may not be separated in physical, a component displayed as a unit may be or may not be a physical unit, that is, may be placed in a same position or may be distributed in multiple network units. A part of or all of modules may be selected to realize the object of the embodiments according to actual requirements. Those skilled in the art can understand and implement the embodiments without creative work.

The embodiments of the present disclosure are introduced in detail above. Specific embodiments are used in the descriptions to describe the present disclosure. The embodiments described above are only used to assist in understanding the method and apparatus according to the present disclosure. For those skilled in the art, changes can be made to the embodiments and the applications based on the concept of the present disclosure. In summary, the specification should not be understood to limit the present disclosure.

The invention claimed is:

1. A target voice detection method, comprising:
receiving sound signals collected by a microphone array;
performing a beamforming process on each frame of the sound signals to obtain beams in different directions for the each frame;
extracting a detection feature of the each frame based on the sound signals and the beams in the different directions;
inputting an extracted detection feature of a current frame into a pre-constructed target voice detection model to obtain a model output result;
obtaining a target voice detection result of the current frame based on the model output result; and
performing target voice detection based on an intensity difference to obtain an intensity difference-based detection result, wherein the obtaining a target voice detection result of the current frame based on the model output result comprises:
fusing the intensity difference-based detection result and the model output result to obtain the target voice detection result of the current frame.

2. The method according to claim 1, wherein a process of constructing the target voice detection model comprises:
determining a topological structure of the target voice detection model;
generating training data based on a clean voice and a simulated noise, and generating labeling information for labeling a target voice in the training data;
extracting a detection feature of the training data; and
obtaining parameters of the target voice detection model by performing training based on the detection feature and the labeling information.

3. The method according to claim 1, wherein the target voice detection model is a classification model or a regression model, and an output of the target voice detection model is an ideal binary mask or an ideal ratio mask for each frequency point of the current frame.

4. The method according to claim 1, wherein the detection feature comprises space dimension information, frequency dimension information, and time dimension information.

5. The method according to claim 1, wherein the extracting a detection feature of each frame based on the sound signals and the beams in different directions comprises:
concatenating the sound signals collected by the microphone array and beam signals at each frequency point of each frame to obtain a multi-dimensional space vector;
calculating a modulus of each element in the multi-dimensional space vector, and then concatenating moduli for all frequency points of each frame to obtain a multi-dimensional frequency vector containing space information; and
performing frame expansion on the multi-dimensional frequency vector containing space information to obtain a multi-dimensional time vector containing space information and frequency information.

6. The method according to claim 1, wherein the performing target voice detection based on an intensity difference to obtain an intensity difference-based detection result comprises:
obtaining a voice reference signal and a noise reference signal based on the beams in different directions;
calculating a power of the voice reference signal and a power of the noise reference signal;
calculating a power ratio of the power of the voice reference signal to the power of the noise reference signal; and
obtaining the intensity difference-based detection result based on the power ratio.

7. A non-transitory computer readable storage medium comprising computer program codes, wherein the computer program codes, when executed by a computer unit, cause the computer unit to perform the target voice detection method according to claim 1.

8. A target voice detection device, comprising: a processor, a memory, and a system bus, wherein
the processor and the memory are connected via the system bus;
the memory stores one or more programs, wherein the one or more programs comprise instructions, and the instructions, when executed by the processor, cause the processor to perform the method according to claim 1.

9. A computer program product stored in a non-transitory computer readable storage medium, when executed on a terminal device, causing the terminal device to perform the method according to claim 1.

10. A target voice detection apparatus, comprising: a signal receiving module, a beamforming module, a detection feature extracting module, a first detecting module, and a detection result outputting module, wherein
the signal receiving module is configured to receive sound signals collected by a microphone array and output the sound signals to the beamforming module,
the beamforming module is configured to perform a beamforming process on each frame of the inputted sound signals to obtain beams in different directions for the each frame,
an input of the detection feature extracting module is connected to an output of the signal receiving module and an output of the beamforming module, and the detection feature extracting module is configured to extract a detection feature of the each frame based on the sound signals and the beams in the different directions, and output the extracted detection feature to the first detecting module,
the first detecting module is configured to input a detection feature of a current frame extracted by the detection feature extracting module into a pre-constructed target voice detection model to obtain a model output result, and send the model output result to the detection result outputting module, and
the detection result outputting module is configured to obtain a target voice detection result of the current frame based on the model output result,
wherein the apparatus further comprises a second detecting module, having an input connected to an output of the beamforming module, configured to perform target voice detection based on an intensity difference to obtain an intensity difference-based detection result and send the intensity difference-based detection result to the detection result outputting module, and
wherein the detection result outputting module is further configured to fuse the intensity difference-based detection result and the model output result to obtain the target voice detection result of the current frame.

11. The apparatus according to claim 10, further comprising: a model constructing module configured to construct the target voice detection model, wherein
the model constructing module comprises:
a structure design unit, configured to determine a topological structure of the target voice detection model,
a training data processing unit, configured to generate training data based on a clean voice and a simulated noise and generate labeling information for labeling a target voice in the training data,
a feature extraction unit, configured to extract a detection feature of the training data, and
a training unit, configured to obtain parameters of the target voice detection model by performing training based on the detection feature and the labeling information.

12. The apparatus according to claim 10, wherein the target voice detection model is a classification model or a regression model.

13. The apparatus according to claim 10, wherein the second detecting module comprises:
a reference signal obtaining unit, configured to obtain a voice reference signal and a noise reference signal based on the beams in different directions;
a calculation unit, configured to calculate a power of the voice reference signal and a power of the noise reference signal and calculate a power ratio of the power of the voice reference signal to the power of the noise reference signal; and
a detection result unit, configured to obtain the intensity difference-based detection result based on the power ratio.

* * * * *